(12) United States Patent
Mhiesan et al.

(10) Patent No.: US 12,233,742 B2
(45) Date of Patent: Feb. 25, 2025

(54) ELECTRIC VEHICLE SUPPLY EQUIPMENT

(71) Applicant: FORD GLOBAL TECHNOLOGIES, LLC, Dearborn, MI (US)

(72) Inventors: Haider Mhiesan, Dearborn, MI (US); Mohamad Mokbel, Farmington Hills, MI (US); Timothy Harris, Grosse Ile, MI (US); Mohamed Elshaer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/221,707

(22) Filed: Jul. 13, 2023

(65) Prior Publication Data

US 2025/0018825 A1 Jan. 16, 2025

(51) Int. Cl.
B60L 55/00 (2019.01)
(52) U.S. Cl.
CPC .................... B60L 55/00 (2019.02)

(58) Field of Classification Search
CPC .................................................... B60L 55/00
See application file for complete search history.

(56) References Cited

U.S. PATENT DOCUMENTS

| | | | |
|---|---|---|---|
| 6,104,160 A | 8/2000 | Iwata et al. | |
| 8,581,545 B2 | 11/2013 | Obayashi et al. | |
| 9,637,017 B2* | 5/2017 | Sung | B60L 58/13 |
| 2021/0061125 A1* | 3/2021 | Nasr | H02M 3/335 |
| 2021/0273453 A1* | 9/2021 | Nishio | H02J 3/32 |
| 2022/0080852 A1 | 3/2022 | Yu et al. | |
| 2023/0234458 A1* | 7/2023 | Salter | B60L 53/66 320/109 |

* cited by examiner

Primary Examiner — Carlos Amaya
(74) Attorney, Agent, or Firm — David B. Kelley; Brooks Kushman P.C.

(57) ABSTRACT

Electric vehicle supply equipment includes at least first and second connectors, and a controller. The controller, responsive to detecting the first and second connectors are engaged with first and second vehicles respectively, synchronizes electric power from the first and second vehicles and supplies the electric power to an entity other than the first and second vehicles.

19 Claims, 3 Drawing Sheets

ELECTRIC VEHICLE SUPPLY EQUIPMENT

TECHNICAL FIELD

The present disclosure relates to electric vehicle supply equipment (EVSE) configured to bidirectionally transfer electric energy to various entities.

BACKGROUND

Electric vehicles rely on one or more traction batteries supplying electric energy to a motor for propulsion. Once connected to an EVSE, the traction battery may be charged using power from an external source (e.g. a grid). Additionally, the EVSE may be configured to supply electric power to one or more entities (e.g. a house) using power from the traction battery.

SUMMARY

A power system has electric vehicle supply equipment that includes at least first and second connectors, and a controller that, responsive to detecting the first and second connectors being engaged with first and second vehicles respectively, synchronizes electric power from the first and second vehicles and supplies the electric power to an entity other than the first and second vehicles.

A method includes, after first and second connectors of electric vehicle supply equipment are engaged with first and second vehicles respectively, synchronizing electric power from the first and second vehicles and supplying the electric power to an entity other than the first and second vehicles.

A power system includes a controller of electric vehicle supply equipment that, while the electric vehicle supply equipment is connected with at least first and second vehicles and is supplying electric power from the first and second vehicles to an entity other than the first and second vehicles, reduces the electric power from one of the first and second vehicles and increases the electric power from the other of the first and second vehicles.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
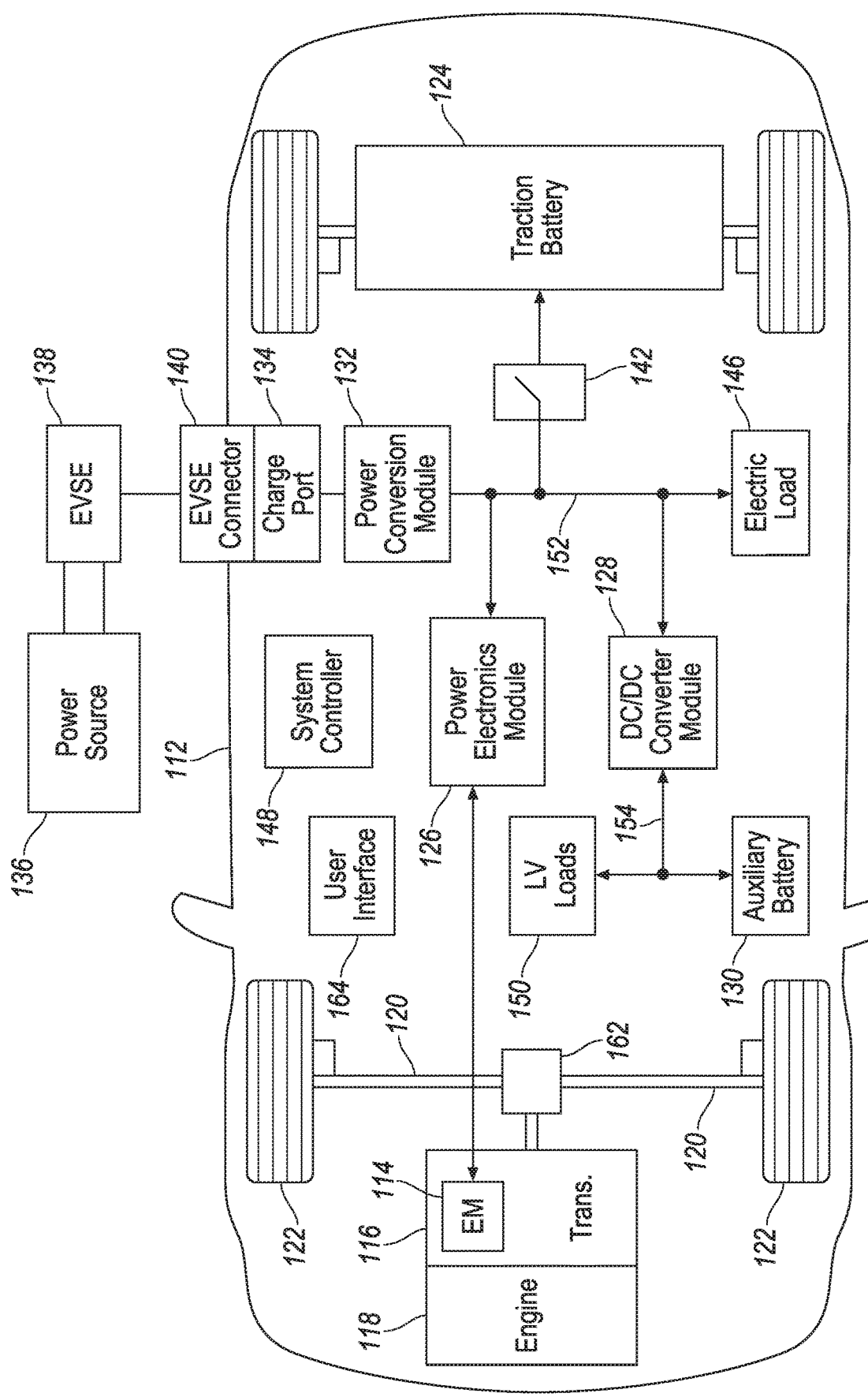
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a Battery Electric Vehicle (BEV). In a BEV configuration, the engine 118 may not be present.

A traction battery or battery pack 124 stores energy that can be used by the electric machines 114. The vehicle battery pack 124 may provide a high voltage direct current (DC) output. The traction battery 124 may be electrically coupled to one or more power electronics modules 126 (such as a traction inverter). One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus/rail. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The EVSE 138 may be coupled to the external power source 136 via an AC coupled system to received AC power therefrom. In one example, the AC coupled system may be adapted to a powerline configuration associated with a building. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. For instance, in a charging mode, the power conversion module 132 may convert AC power received from the EVSE 138 into DC power to supply to the traction battery 124. In an outputting mode, the power conversion module 132 may convert DC power from the traction battery 124 into AC power to supply to an off-board entity via the EVSE 138. The EVSE connector 140 may have pins that mate with corresponding recesses of the charge port 134. Alternatively, various components described as being electrically coupled or connected may transfer power using a wireless inductive coupling. Additionally, the vehicle 112 may be configured to provide electric power from the traction battery 124 to off-board power entities and/or a power grid (not shown) via the EVSE 138 and EVSE connector 140 under the control of local controllers including the power conversion module 132 and/or one or more remote controllers such as a cloud server (not shown). The vehicle 112 may be operated as a portable power storage to transfer power from and to an off-board power entity (to be described in detail below).

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by the Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
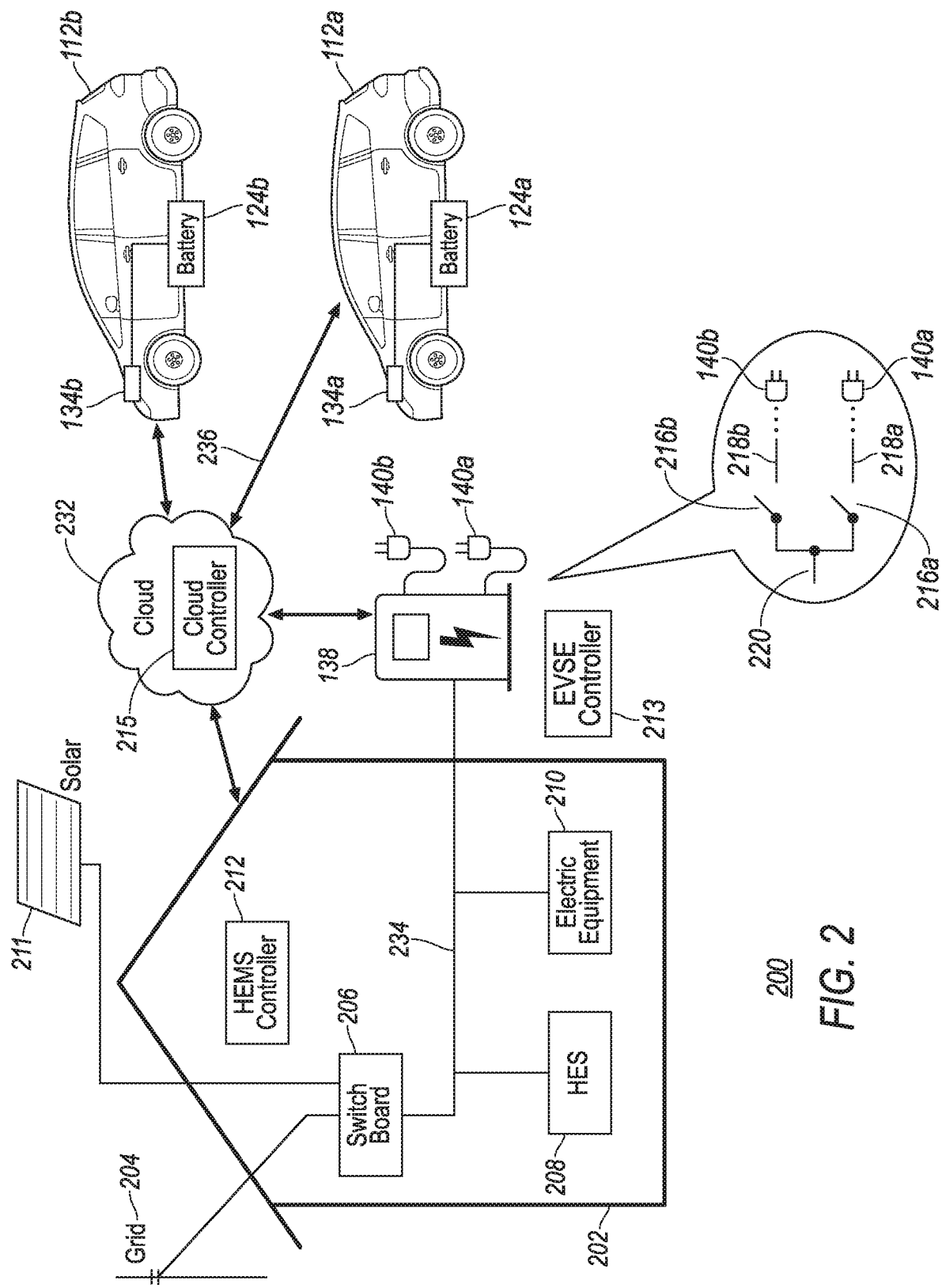
FIG. 2 is a diagram of a home energy management system associated with an electric vehicle.

FIG. 2 depicts a diagram of a home energy management system (HEMS) associated with an electric vehicle. A home energy ecosystem (HEE) 200 in the present example may be implemented for a house/building 202. The house 202 may access electric power from a power grid 204 via a switch board 206 configured to provide various components of the HEE 200 with electric power via an internal powerline 234. For instance, the HEE 200 may include one or more electric equipment 210 (e.g. appliance) configured to consume electricity and provide various features to the household. The HEE 200 may further include a home energy storage (HES) 208 configured to store electric energy. The HES 208 may be implemented in various forms. As an example, the HES 208 may include a rechargeable battery (e.g. lithium-ion battery) to store electric energy received from the grid 204 (or other sources) and to provide the electric energy to the internal powerline 234 whenever needed. Since the electric energy may be stored as DC power in the HES 208, one or more DC/AC inverters may be provided with the HES 208 for power transitions. The house 202 may be further connected to a solar panel 211 via the switch board 206. The solar panel 211 may be configured to generate and supply electric power to the HES 208 via the internal power line 234. The solar panel 211 may generate a DC electric power having a voltage that is the same or different from the voltage of the HES 208. In one example, the solar panel 211 may be configured to charge the HES 208 via one or more DC/DC converters. Alternatively, one or more DC/AC inverters may be provided with the solar panel 211 and/or the switch board for power transitions. It is noted that although the solar panel 211 is provided to the house 202 for electric power generating in the present embodiment, the present disclosure is not limited thereto. In other words, the house 202 may be provided with other means of power generating capabilities such as a wind, turbine or the like. In one example, the switch board 206, HES 208 and electric equipment 210 are parts of the AC-coupled system connected to the EVSE 138 via AC power lines.

With continuing reference to FIG. 2, the internal powerline 234 may be further connected to an EVSE 138 configured to transfer electric energy with one or more electric vehicles 112. The EVSE 138 may be installed within or near the house 202 (e.g. in a garage) and adapted to a home electric energy configuration having a predefined voltage and maximum current supported by the switch board 206. As discussed with reference to FIG. 1, the EVSE 138 may be configured to connect to the vehicles 112 via the charge port 134 to charge the traction battery 124. Additionally, the EVSE 138 may be further configured to draw electric power from the traction battery 124 of the vehicles 112 to supply power to the HEE 200 or the grid 204. For instance, in case of a power outage or shortage from the grid 204, the EVSE 138 may be configured to draw electric power from the vehicles 112 to power the components of the house 202. Additionally or alternatively, the EVSE 138 may be configured to draw electric power from the solar panel 211, the HES 208 and/or the traction battery 124 to supply power to the grid 204. As illustrated in FIG. 2, two vehicles 112a, 112b are associated with the HEE 200 in the present example. The EVSE 138 may be provided with two EVSE connectors 140a, 140b configured to simultaneously connect to the two vehicles 112a, 112b for energy transfer. Each EVSE connector 140 may be connected to the high-voltage (HV) bus 220 of the EVSE 138 via a cable through one or more contactors 216. When the contactor 216 is open, the corresponding EVSE connector 140 is disconnected from the HV bus 220. When the contactor 216 is closed, the corresponding EVSE connector 140 is connected to the HV bus 220. The HV bus 200 of the EVSE 138 may be an AC bus in support of various voltages to accommodate various design needs. For instance, the voltage on the HV bus 220 may be adjusted to accommodate different voltages as supported by different vehicles 112.

The power management of the HEE 200 may be individually or collectively controlled and coordinated by one or more local and/or remote controllers. For instance, The HEE 200 may be controlled by a HEMS controller 212 associated with the building 202. The HEMS controller 212 may be implemented in various manners. For instance, the HEMS controller 212 may be a dedicated controller located within the house 202 and connected to components of smart home devices HEE 200 via wired or wireless connections (not shown). Additionally or alternatively, the HEE 200 may be controlled via an EVSE controller 213 implemented as a part of the EVSE 138 in communication with various entities including the vehicles 112 and various entities associated with the house 202. Additionally or alternatively, the HEE 200 may be controlled via a cloud controller 215 implemented via a cloud server through the Internet and configured to remotely monitor and control the operations of components of the HEE 200. In any or all of the above implementation examples, the controllers 212, 213, 215 may be provided with software to monitor and control the operations of the various components of the home energy ecosystem HEE 200. The controllers 212, 213, 215 may be further provided with an interface associated with input and output devices to interact with a user of the HEE 200. It is noted that the term cloud 232 recited in the present disclosure is used as a general term and may include any computing network involving carriers, router, computers, controllers, circuitries, servers or the like configured to store data and perform data processing functions and facilitate communication between various entities.

Figure 3:
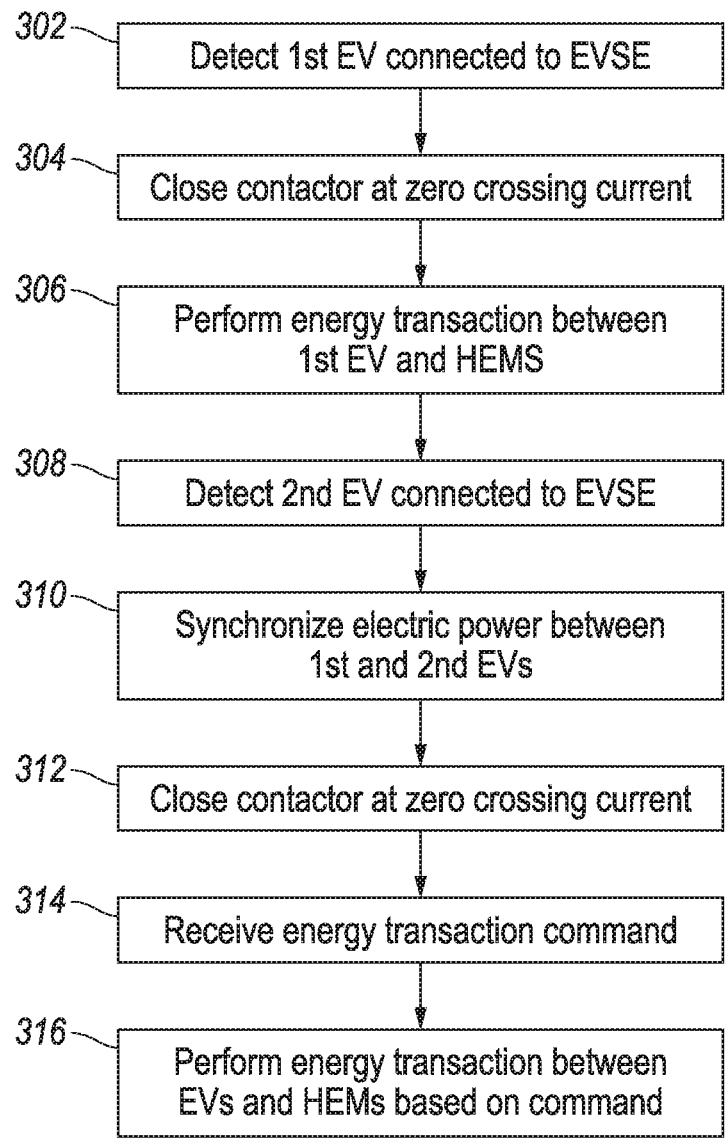
FIG. 3 is a flow diagram of a process for managing energy transaction between various entities.

Referring to FIG. 3, an example flow diagram of a process 300 for managing energy transactions between various entities associated with the HEE 200 is illustrated. With continuing reference to FIGS. 1 and 2, the process 300 may be individually or collectively implemented via one or more of the EVSE controller 213, the HEMS controller 212, the cloud controller 215, and/or the vehicle system controller 148. For simplicity, the following description will be made with reference to the EVSE controller 213. Responsive to detecting a first vehicle 112a has connected to the EVSE 138 via one of the EVSE connectors 140 (e.g. the first EVSE connector 140a) at operation 203, the EVSE controller 213 measures the high-voltage AC output of the vehicle 112a and closes the corresponding contactor 216a to connect the HV bus 220 of the EVSE 138 with the first vehicle 112 at operation 304. To minimize the heat on the contactor 140a generated by an in-rush current at the moment when the contactor 140a closes, the EVSE controller 213 may measure the phase of the AC current from the first vehicle 112a and close the first contactor 140a at a zero crossing current where the AC current is at zero volts. For instance, the AC current from the power conversion module 132 of the vehicle 112 may be in a sinusoidal waveform which crosses zero volts at each half-cycle. Upon detecting the phase and timing of the AC waveform, the EVSE controller 213 may operate the contactor 140a to close at the time when the AC current crosses at zero voltage.

At operation 306, the EVSE controller 213 operates to perform the electric energy transaction between the first vehicle 112a and various entities associated with the HEE 200. The energy transaction may be performed in a pre-defined energy scheme. For instance, the EVSE 138 may draw the electric charge from the traction battery 124 of the first vehicle 112a to supply the energy to entities such as the electric equipment 210 and/or the HES 208 of the building 202. Alternatively, the energy scheme may indicate the EVSE 138 to charge the traction battery 112 using power from other entities such the grid 204 and or the HES 208. The user may alter and modify the energy scheme to achieve a desired target. For instance, responsive to receiving user instructions from the cloud 232 indicative of a user command to modify the energy scheme to revise the energy distribution target between various entities of the HEE 200, the EVSE controller 213 may adjust the energy transaction accordingly.

At operation 308, the EVSE 138 may detect a second vehicle 112b has connected to the EVSE 138 via the second EVSE connector 140b. As discussed above, the HEE 200 may be associated with a plurality of vehicles 112 each having a traction battery 124. The additional traction battery connected to the HEE 200 via the EVSE 138 may provide more flexible and complex energy scheme configurations. At operation 308, the EVSE 138 may detect a second vehicle 112b has connected to the EVSE 138 via the second EVSE connector 140b. In preparation of closing the corresponding contactor 216b to connect the second vehicle 112b to the HV bus 220, the EVSE controller 213 measures the characteristics of the AC power from both the first and second vehicles 112a, 112b and synchronizes the two AC powers. Since the first vehicle 112a has already connected to the HV bus 220 of the EVSE 138, the synchronization may be preferably performed by operating the AC output of the newly connected second vehicle 112b to adapt to the AC power on the HV bus 220. For instance, the EVSE controller 213 may perform the synchronization by commanding the second vehicle 112b to modify the AC power of the power conversion module 132 using the voltage, frequency, phase, and/or amplitude of the AC power on the HV bus 220 when it is possible. However, since the first vehicle 112a and second vehicle 112b may have different power configurations, adjusting the newly connected second vehicle 112b alone may not be always possible in some cases because the present AC power on the HV bus 220 may be beyond the supported range of the second vehicle 112b. For instance, when there is only the first vehicle 112a connected to the EVSE 138, the voltage on the HV bus 220 may be set to 400V as such a high voltage supported by both the EVSE 138 and the first vehicle 112a may increase the efficiency of the power transaction. However, the newly connected vehicle 112b may only support an AC voltage up to 360V due to a different configuration. In this case, adjusting the AC power output from the second vehicle 112b to 400V is not available and the power configurations of the EVSE 138 and the first vehicle 112a need to be adjusted in order to synchronize all of the entities. The EVSE controller 213 may command both the first and second vehicle 112a, 112b to adjust to the same AC voltage, frequency, and phase that is supported by both to perform the synchronization.

Once the AC power of both the first and second vehicles 112a, 112b are synchronized, at operation 312, the EVSE controller 213 closes the second contactor 216b at the zero crossing current similar to the operation 304 described above. Once both the first and second vehicles 112a, 112b are connected to the HV bus 220 of the EVSE 138, the EVSE controller 213 may perform various operations to facilitate the energy transaction between entities. As described above, the user may control the power traction by sending commands to the EVSE controller 213. At operation 314, responsive to receiving a command indicative of the energy scheme, the process proceeds to operation 316 and the EVSE controller 213 coordinates various entities of the HEE to perform the newly received energy scheme. Since the AC power on the HV bus 220 are synchronized with the AC power from both the first and second vehicles 112a, 112b in voltage, frequency and phase, adjusting power transactions between the various entities may be relatively easy. The EVSE controller 213 may perform the adjustment by commanding the entities involved in the transaction to output or receive electric power at a target power level via the HV bus 220 to facilitate the energy transaction.

The energy scheme may be applied to various examples. For instance, the energy scheme may be indicative of an energy transaction from the one or more vehicles 112 to supply electric charge to power the building 202 during a time frame. When there is only the first vehicle 112a connected to the HEE 200 via the EVSE 138, the first vehicle 112a may be the only source of energy (e.g. supplying 100% of total power) to supply electric charge to the building 202. Once the second vehicle 112b is connected to the HEE 200 via the EVSE 138, the EVSE 138 may gradually increase the energy output from the second vehicle 112b and simultaneously gradually decrease the energy output from the first vehicle 112a while keeping a total amount of energy supply to the building 202 unchanged. Depending on the SOC of the traction battery of both the vehicles 112, the EVSE controller 213 may gradually achieve a target power distribution that draws more power from the battery having a higher SOC (e.g. supplying 70% of total power) and less power from the battery having the lower SOC (e.g. supplying 30% of total power) to supply to the building 202. In an alternative example, the EVSE 138 may facilitate power transactions between the first and second vehicles 112a, 112b without the involvement of other entities of the HEE 200. For instance, responsive to detecting a first vehicle 112a is low in SOC and the second vehicle 112b has sufficient charge, the EVSE controller 213 may transfer energy from the second vehicle 112b to the first vehicle 112a at a power level preferred by the user.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A power system comprising:
electric vehicle supply equipment including at least first and second connectors, and a controller programmed to, responsive to detecting the first and second connectors being engaged with first and second vehicles respectively, synchronize electric power from the first and second vehicles and supply the electric power to an entity other than the first and second vehicles.

2. The power system of claim 1, wherein the controller is further programmed to reduce the electric power from one of the first and second vehicles.

3. The power system of claim 2, wherein the controller is further programmed to electrically disconnect the one of the first and second vehicles to preclude electric power flow from the one of the first and second vehicles.

4. The power system of claim 1, wherein the controller is further programmed to, responsive to detecting the first and second connectors being engaged with the first and second vehicles respectively, supply electric power from the first vehicle to the second vehicle and the entity at a same time.

5. The power system of claim 4, wherein the controller is further programmed to alter a share of the electric power being supplied to the second vehicle and the entity.

6. The power system of claim 1, wherein the controller is further programmed to, responsive to detecting the first connector being engaged with the first vehicle, supply electric power from the first vehicle to the entity.

7. The power system of claim 1, wherein the controller is further programmed to synchronize the electric power by adjusting a voltage, amplitude, frequency, or phase of the electric power from one of the first and second vehicles to match that of the other of the first and second vehicles.

8. A method comprising:
after first and second connectors of electric vehicle supply equipment are engaged with first and second vehicles respectively, synchronizing electric power from the first and second vehicles and supplying the electric power to an entity other than the first and second vehicles.

9. The method of claim 8 further comprising reducing the electric power from one of the first and second vehicles.

10. The method of claim 8 further comprising electrically disconnecting the one of the first and second vehicles to preclude electric power flow from the one of the first and second vehicles.

11. The method of claim 8 further comprising, after the first and second connectors are engaged with the first and second vehicles respectively, supplying electric power from the first vehicle to the second vehicle and the entity at a same time.

12. The method of claim 11 further comprising altering a share of the electric power being supplied to the second vehicle and the entity.

13. The method of claim 8 further comprising, after the first connector is engaged with the first vehicle, supplying electric power from the first vehicle to the entity.

14. The method of claim 8, wherein the synchronizing includes adjusting a voltage, amplitude, frequency, or phase of the electric power from one of the first and second vehicles to match that of the other of the first and second vehicles.

15. A power system comprising:
 a controller of electric vehicle supply equipment programmed to, while the electric vehicle supply equipment is connected with at least first and second vehicles and is supplying electric power from the first and second vehicles to an entity other than the first and second vehicles, reduce the electric power from one of the first and second vehicles and increase the electric power from the other of the first and second vehicles.

16. The power system of claim 15, wherein the controller is further programmed to synchronize the electric power from the first and second vehicles by adjusting a voltage, amplitude, frequency, or phase of the electric power from one of the first and second vehicles to match that of the other of the first and second vehicles.

17. The power system of claim 15, wherein the controller is further programmed to electrically disconnect the one of the first and second vehicles to preclude electric power flow from the one of the first and second vehicles.

18. The power system of claim 15, wherein the controller is further programmed to, while the electric vehicle supply equipment is connected with at least the first and second vehicles, supply electric power from the first vehicle to the second vehicle.

19. The power system of claim 15, wherein the controller is further programmed to, while the electric vehicle supply equipment is connected with the first vehicle, supply electric power from the first vehicle to the entity.

* * * * *